United States Patent [19]
Farrell

[11] Patent Number: 4,749,536
[45] Date of Patent: Jun. 7, 1988

[54] INJECTION MOLDING METHOD FOR FILLING MOLD AND MAINTAINING PRESSURE

[75] Inventor: John J. Farrell, Greenbrook, N.J.

[73] Assignee: Tri-Delta Technology, Inc., Edison, N.J.

[21] Appl. No.: 76,030

[22] Filed: Jul. 21, 1987

Related U.S. Application Data

[62] Division of Ser. No. 874,274, Jun. 13, 1986.

[51] Int. Cl.$^4$ .............................................. B29C 45/77
[52] U.S. Cl. ................................... 264/219; 264/40.5; 264/328.8; 264/328.19
[58] Field of Search ..................... 264/40.3, 40.5, 40.1, 264/219, 328.1, 328.4, 328.8, 328.17, 328.19; 425/146, 557, 559, 555, 560, 558

[56] References Cited

U.S. PATENT DOCUMENTS

| | | | |
|---|---|---|---|
| Re. 28,721 | 2/1976 | Farrell | 425/564 |
| 3,940,223 | 2/1976 | Farrell | 425/533 |
| 4,070,142 | 1/1978 | Farrell | 425/562 |
| 4,073,944 | 2/1978 | Dawson | 425/562 |
| 4,154,287 | 5/1979 | Kharagezor et al. | 425/585 |
| 4,389,358 | 6/1983 | Hendry | 264/328.19 |
| 4,390,332 | 6/1983 | Hendry | 425/560 |
| 4,632,652 | 12/1986 | Farrell | 425/555 |

Primary Examiner—Jan H. Silbaugh
Assistant Examiner—J. Fortenberry
Attorney, Agent, or Firm—Ralph W. Selitto, Jr.

[57] ABSTRACT

The present invention increases the shot capacity and the screw recovery time of an injection molding machine without increasing hydraulic pump capacity or motor horsepower. In accordance with one aspect of the invention, an existing injection molding machine is retrofitted with two cylinder and piston arrangements which are bolted onto the machine between its plasticizer barrel and its melt manifold. One of the cylinder and piston arrangements is employed to perform a mold-filling operation, whereas the other cylinder and piston arrangement is employed to perform packing and suck back operations.

17 Claims, 2 Drawing Sheets

INJECTION MOLDING METHOD FOR FILLING MOLD AND MAINTAINING PRESSURE

This is a division of application Ser. No. 874,274, filed June 13, 1986.

FIELD OF THE INVENTION

The present invention relates to injection molding or injection blow molding machines and methods.

BACKGROUND OF THE INVENTION

In order to reduce the molding cycle of injection molding machines, such machines have been provided with a valve adapted to cut off communication between a mold and a plasticizer (i.e., extruder) as soon as the plasticizer has completed injecting plastic material into the mold, whereby the plasticizer can start to accumulate plastic material for another shot as the plastic material in the mold cools (see, for instance, U.S. Pat. No. Re. 28,721). An auxiliary piston and cylinder arrangement performs a packing operation by maintaining pressure on the plastic material to the mold and supplying additional plastic material to the mold in order to compensate for shrinkage during the cooling cycle. At the conclusion of the cooling cycle, the auxiliary piston and cylinder arrangement also performs a suck back operation by which plastic material contained in a runner is severed from the plastic material in the mold.

In order to further reduce the molding cycle of injection molding machines, such machines have utilized two plasticizers which function alternately (see, for instance, U.S. Pat. Nos. 3,940,223 and 4,070,142). The two plasticizers operate in synchronization such that one is prepared for the next injection operation, while the other one is injecting plastic material into the mold. More particularly, as soon as either plasticizer has injected plastic material into the mold, a valve shuts off that plasticizer from communication with the mold. A piston and cylinder arrangement is then employed to perform the packing and the suck back operations described above. Thus, the piston and cylinder arrangement performs two operations which would normally be performed by the plasticizers. However, because the plasticizers still perform a mold filling function, the molding machines which utilize such plasticizers still suffer from two disadvantages which are common to screw type plasticizers: namely, relatively low injection pressures and slow fill rates.

SUMMARY OF THE PRESENT INVENTION

In accordance with the present invention, a screw type plasticizer of an injection molding machine supplies plastic material to a receiving means, such as an interior chamber of a cylinder, while both the plasticizer and the receiving means are shut off from communication with a mold by, for instance, closing a control valve situated in a passage extending between the mold and the plasticizer. After establishing communication between the mold and the receiving means, the plastic material contained in the receiving means is injected into the mold by an injecting means, such as a reciprocating plunger associated with the cylinder. If the plasticizer is of the reciprocating screw type, the plasticizer can assist in the injection of plastic material into the mold. Using a separate injecting means to at least assist in the injection of plastic material into the mold is advantageous because it permits higher pressures and faster fill rates to be attained.

After the mold has been filled, the receiving means and the plasticizer are once again shut off from the mold so that the plasticizer can immediately begin to refill the receiving means with plastic material in preparation for the injection of another shot into the mold. The immediate refilling of the receiving means reduces the length of the overall molding cycle, whereby higher production rates can be attained.

During the refilling cycle, pressure is maintained on the plastic material in the mold by means, such as an auxiliary cylinder and piston arrangement, other than the plasticizer or the injecting means, whereby additional plastic material is supplied to the mold to compensate for shrinkage during cooling. In addition to performing this packing function, such other means can also be employed to perform a suck back function.

By constructing the various components of the present invention as individual modules, existing injection molding machines can be retrofitted with such modules so as to increase shot capacity. Thus, in installations in which the normal shot of an existing injection molding machine is too small for a particular job, retrofitting of such a machine in accordance with the present invention eliminates the need to replace the entire machine or, at least, the plasticizer thereof.

BRIEF DESCRIPTION OF THE DRAWINGS

For a better understanding of the present invention, reference is made to the following detailed description of two exemplary embodiments considered in conjunction with the accompanying drawings, in which.

DETAILED DESCRIPTION OF THE EXEMPLARY EMBODIMENTS

Figure 1:
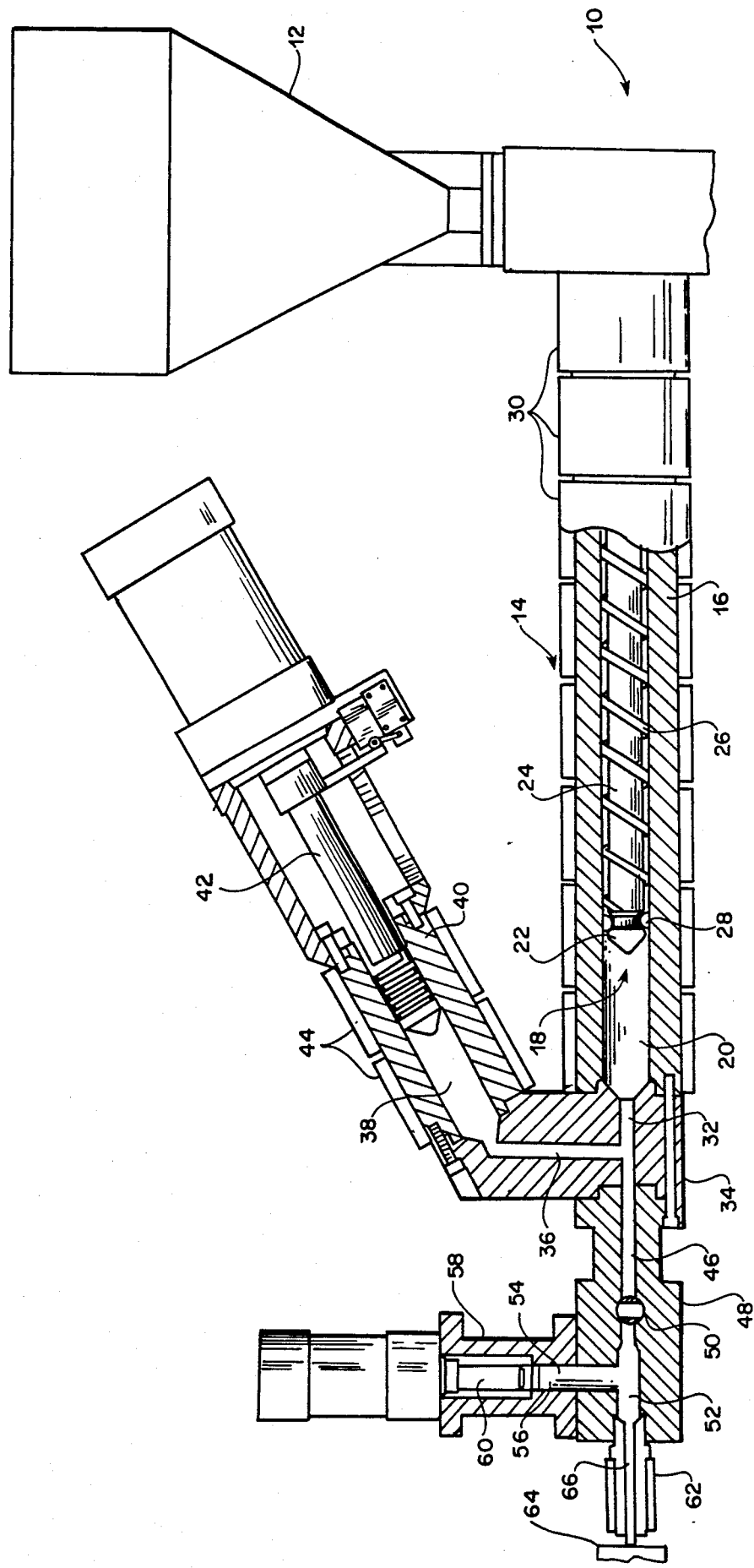
FIG. 1 is a cross-sectional view of an injection molding machine of the reciprocating screw type which is constructed in accordance with one embodiment of the present invention.

With reference to FIG. 1, there is shown a plasticizer section 10 of an injection molding or injection blow molding apparatus. The plasticizer section 10 includes a hopper 12, which is filled with plastic material, and a horizontally arranged, reciprocating screw type plasticizer or extruder 14, which receives plastic material from the hopper 12.

The extruder 14 includes a barrel 16 and a plasticizer screw 18, which is rotatably mounted in an interior chamber 20 of the barrel 16. Any suitable rotational drive mechanism, such as the one disclosed in U.S. Pat. No. Re. 28,721, may be employed to rotate the screw 18. The screw 18 is also mounted for reciprocating (i.e., longitudinal) movement within the barrel 16, such reciprocating movement being achieved by any suitable reciprocating drive mechanism, such as the one disclosed in U.S. Pat. No. Re. 28,721. The screw 18 includes a head 22 and a body 24 having a helical flight 26. A check ring 28 is disposed about the screw 18 between the head 22 and the body 24 thereof for a purpose to be described hereinafter. Band heaters 30 are disposed about the barrel 16 in order to maintain plastic material contained in the chamber 20 at an elevated temperature.

The chamber 20 communicates with a passage 32 formed in a housing 34, which is attached to the barrel 16. The housing 34 contains another passage 36 in communication with the passage 32. The passage 36 communicates, in turn, with an interior chamber 38 of a cylinder 40. A plunger 42 is mounted for reciprocating movement within the chamber 38. Band heaters 44 are disposed about the cylinder 40 in order to maintain plastic material contained in the chamber 38 at an elevated temperature.

The passage 32 also communicates with a passage 46 formed in a housing 48, which is attached to the housing 34. The passage 46 contains a rotary shut-off valve 50 for a purpose to be described hereinafter. The passage 46 also communicates with an enlarged passage 52, which, in turn, communicates with another passage 54. The passage 54 communicates with an interior chamber 56 of a cylinder 58. A plunger 60 is mounted for reciprocating movement within the chamber 56.

A melt manifold 62 extends from the housing 48 to a mold 64. The manifold 62 includes a restricted passage 66, which may be considered as part of the runner of the mold 64.

In operation, with the valve 50 in its closed position (i.e., the position illustrated in FIG. 1), plastic material is fed from the hopper 12 to the extruder 14. Upon rotation of the screw 18 in an appropriate direction, the helical flight 26 conveys the plastic material through the chamber 20. As the plastic material is being conveyed through the chamber 20, the band heaters 30 heat the plastic material. The plastic material which has passed the check ring 28 is prevented from reentering the helical flight 26 by the check ring 28. The continued rotation of the screw 18 causes the plastic material to be conveyed into the passages 32, 46. Because the closed valve 50 prevents the plastic material from being conveyed into the passage 52, the plastic material is conveyed from the passage 32 to the passage 36 and then to the chamber 38. As the plastic material fills the chamber 38, where it is maintained at an elevated temperature by the band heaters 44, the plunger 42 is forced back until it reaches a fully retracted position. When the plunger 42 has been fully retracted, the back pressure exerted on the plastic material by the plunger 42 is transmitted to the head 22 of the screw 18, thereby forcing back the screw 18 until it reaches a fully retracted position.

After the screw 18 reaches its fully retracted position, the valve 50 is rotated 90° to its open position and the screw 18 and the plunger 42 are moved forward in the chambers 20, 38, respectively, to their fully extended positions, whereby the plastic material contained in the chambers 20, 38 is injected into the mold 64 through the passages 32, 36 in the housing 34, the passage 46 in the housing 48, the valve 50, the passage 52 in the housing 48 and the passage 66 in the manifold 62. As the mold 64 is filled, the plastic material will also fill the passage 54 in the housing 48.

Once the mold 64 has been filled, the valve 50 is rotated 90° to its closed position and a force is applied to the plunger 60 so as to urge it toward an extended position within the chamber 56. Of course, the plastic material contained in the passages 52, 54 of the housing 48, the passage 66 of the manifold 62 and the mold 64 creates a counteracting force which prevents the plunger 60 from being extended. However, as the plastic material in the mold 64 cools and shrinks, the plunger 60 is extended so as to inject some of the plastic material contained in the passages 52, 54, 66 into the mold 64.

Thus, the plunger 60 functions to maintain pressure on the plastic material in the mold 64 and to supply the mold 64 with any additional plastic material which is necessary so as to compensate for shrinkage. Because the plunger 60 is employed to maintain pressure on the plastic material in the mold 64 (i.e., to perform a packing operation), the chambers 20, 38 can be refilled with plastic material during the performance of such a packing operation by the plunger 60.

At the conclusion of the molding operation, the plunger 60 is retracted so as to suck back at least some of the plastic material contained in the passage 66 of the manifold 62, thereby severing the plastic material in the manifold 62 from the molded article in the mold 64. The mold 64 is then opened and the molded article removed therefrom. Any excess plastic material contained in the passages 52, 54, 66 can be used during the next molding operation, which is initiated by opening the valve 50 after the chambers 20, 38 have been refilled.

One advantage of the embodiment illustrated in FIG. 1 is that it has the capability of maintaining a high packing pressure (i.e., about 20,000 psi or more) and a low screw recovery pressure (i.e., a plastic pressure of from about 500 psi to about 10,000 psi). Although higher screw recovery pressures can be attained, lower screw recovery pressures are usually desired in order to inhibit the production of shear and/or frictional heat in the plastic.

Another advantage of the embodiment illustrated in FIG. 1 is that the screw recovery operation can begin as soon as the mold filling operation has been completed. This results in a significant reduction in the length of the overall molding operation, thereby making higher production rates possible.

Because of its modular construction, the embodiment of FIG. 1 is adapted for retrofitting on existing injection molding machines. Thus, if the normal shot of an existing injection molding machine is too small for a particular job, the embodiment of FIG. 1 permits the capacity of the shot to be increased threefold or fourfold, for example, without having to replace the entire injection molding machine or, at least, its plasticizer screw.

Figure 2:
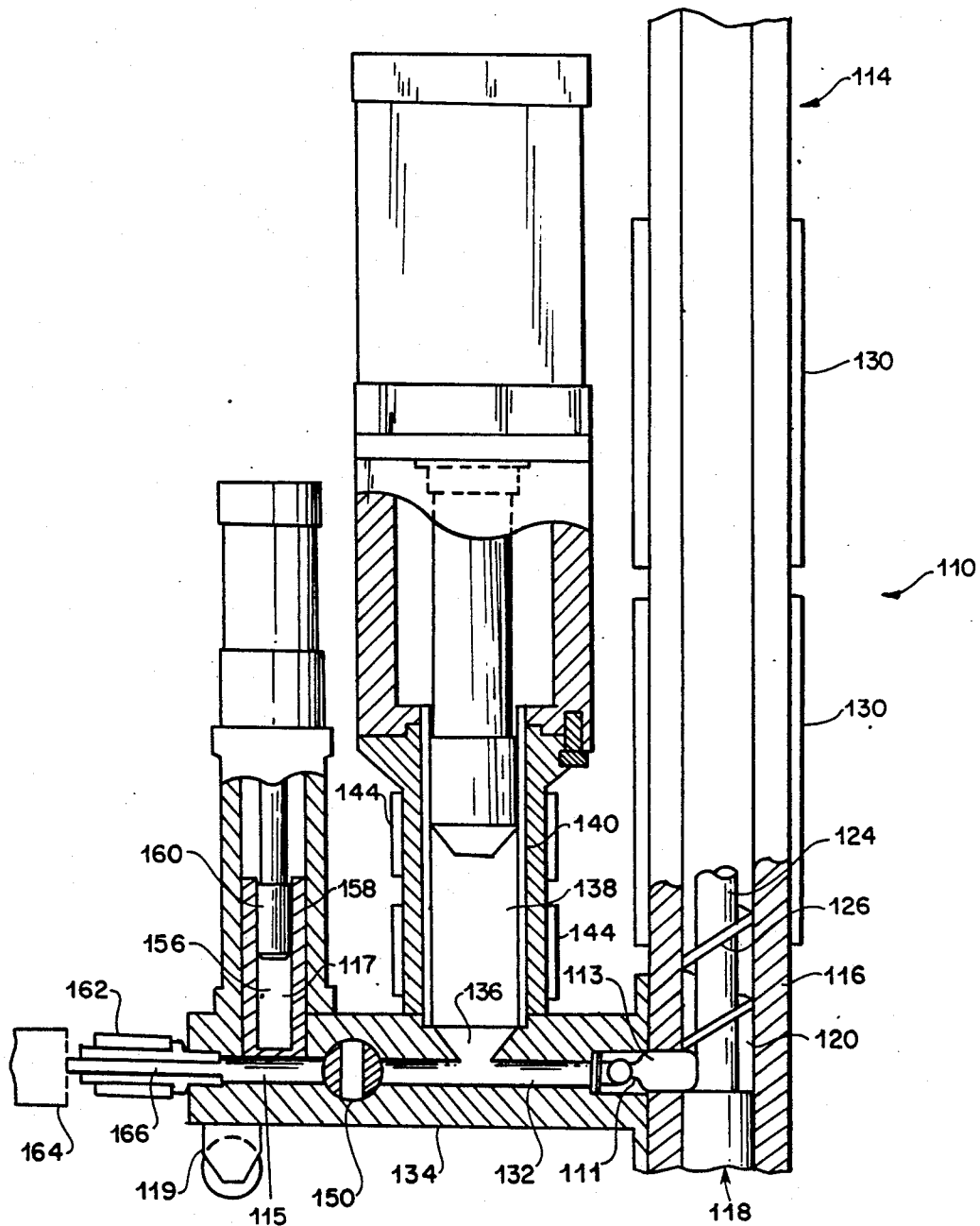
FIG. 2 is a cross-sectional view of an injection molding machine of the non-reciprocating screw type which is constructed in accordance with another embodiment of the present invention.

Another exemplary embodiment of the present invention is illustrated in FIG. 2. The various elements illustrated in FIG. 2 which correspond to the elements described above with respect to the embodiment illustrated in FIG. 1 are designated by corresponding reference numerals increased by one hundred. All additional elements illustrated in FIG. 2 which do not correspond to elements described above with respect to FIG. 1 are designated by odd reference numerals. Unless otherwise stated, the embodiment of FIG. 2 operates in the same manner as the embodiment of FIG. 1.

Referring now to FIG. 2, there is shown a plasticizer section 110 of an injection molding or injection blow molding apparatus. The plasticizer section 110 includes a hopper (not shown), which is filled with plastic material, and a vertically arranged, non-reciprocating screw type plasticizer or extruder 114, which receives plastic material from the hopper.

The extruder 114 includes a barrel 116 and a plasticizer screw 118, which is rotatably mounted in an interior chamber 120 of the barrel 116. Any suitable rotational drive mechanism (not shown) may be employed to rotate the screw 118, which, however, is not mounted for reciprocating (i.e., longitudinal) movement within the barrel 116. The screw 118 includes a body 124 having a helical flight 126. A check valve 111 is disposed in a discharge port 113 of the barrel 116 for a purpose to be described hereinafter. Band heaters 130 are disposed about the barrel 116 in order to maintain plastic material contained in the chamber 120 at an elevated temperature.

The chamber 120 communicates through the discharge port 113 with a passage 132 formed in a housing 134, which is attached to the barrel 116. The housing 134 contains another passage 136 in communication with the passage 132. The passage 136 communicates, in turn, with an interior chamber 138 of a cylinder 140. A plunger 142 is mounted for reciprocating movement within the chamber 138. Band heaters 144 are disposed about the cylinder 140 in order to maintain the plastic material contained in the chamber 138 at an elevated temperature. The passage 132 also communicates with another passage 115 formed in the housing 134. A rotary shut-off valve 150 is arranged between the passages 115, 132 for a purpose to be described hereinafter. The passage 115 also communicates with a passage 117, which, in turn, communicates with an interior chamber 156 of a cylinder 158. A plunger 160 is mounted for reciprocating movement within the chamber 156. An adjustable roller assembly 119 facilitates the support of the housing 134.

A melt manifold 162 extends from the housing 134 to a mold 164. The manifold 162 includes a restricted passage 166, which may be considered as part of the runner of the mold 164.

In operation, with the valve 150 in its closed position, plastic material is fed from the hopper (not shown) to the extruder 114. Upon rotation of the screw 118 in an appropriate direction, the helical flight 126 conveys the plastic material through the chamber 120. As the plastic material is being conveyed through the chamber 120, the band heaters 130 heat the plastic material. The plastic material which exits the chamber 120 through the port 113 is prevented from reentering the helical flight 126 by the check valve 111. The continued rotation of the screw 118 causes the plastic material to be conveyed into the passages 132, 136. Because the closed valve 150 prevents the plastic material from being conveyed into the passage 115, the plastic material is conveyed from the passage 132 to the passage 136 and then to the chamber 138. As the plastic material fills the chamber 138, where it is maintained at an elevated temperature by the band heaters 144, the plunger 142 is forced back until it reaches a fully retracted position.

After the plunger 142 reaches its fully retracted position, the valve 150 is rotated 90° to its open position and the plunger 142 is moved in the chamber 138 to its fully extended position, whereby the plastic material in the chamber 138 is injected into the mold 164 through the passages 132, 136 in the housing 134, the valve 150, the passage 115 in the housing 134 and the passage 166 in the manifold 162. During the filling of the mold 164, the plastic material will also fill the passage 117 in the housing 134.

Once the mold 164 has been filled, the valve 150 is rotated 90° to its closed position and a force is applied to the plunger 160 so as to urge the plunger 160 toward its extended position within the chamber 156. Of course, the plastic material contained in the passages 115, 117 of the housing 134, the passage 166 of the manifold 162 and the mold 164 creates a counteracting force which prevents the plunger 160 from being extended. However, as the plastic material in the mold 164 cools ad shrinks, the plunger 160 is extended so as to inject some of the plastic material contained in the passages 116, 117, 166 into the mold 164. Thus, the plunger 160 functions to maintain pressure on the plastic material in the mold 164 and to supply the mold 164 with any additional plastic material which is necessary so as to compensate for shrinkage. Because the plunger 160 is employed to maintain pressure on the plastic material in the mold 164 (i.e., to perform a packing operation), the chamber 138 can be refilled with plastic material during the performance of such a packing operation by the plunger 160.

At the conclusion of the molding operation, the plunger 160 is retracted so as to suck the plastic material from the passage 166 in the manifold 162, thereby severing the plastic material in the manifold 162 from the molded article in the mold 164. The mold 164 is then opened and the molded article removed therefrom. Any excess plastic material contained in the passages 115, 117, 166 can be used during the next molding operation, which is initiated by opening the valve 150 after the chamber 138 has been refilled.

One advantage of the embodiment illustrated in FIG. 2 is that it allows the plastic to be injected into the mold at higher pressures and velocities than those normally obtainable using non-reciprocating screw extruders. Also, whereas a non-reciprocating screw extruder is normally incapable of generating packing pressures in the neighborhood of 20,000 psi, the embodiment of FIG. 2 permits this type of extruder to achieve such packing pressures.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

I claim:

1. A method of increasing the shot capacity and the screw recovery time of an existing injection molding machine, which includes an extruder, having an interior chamber and a screw mounted for rotation within said interior chamber of said extruder such that said screw, upon its rotation, conveys plastic material through said interior chamber of said extruder, and a mold communicating with said extruder through a flow path extending between said mold and said interior chamber of said extruder, said method comprising the step of retrofitting said injection molding machine with controlling means arranged in said flow path between said extruder and said mold for controlling the flow of plastic material through said flow path, said controlling means being movable between a closed position in which said controlling means prevents plastic material from flowing through said flow path and an open position in which said controlling means permits plastic material to flow through said flow path, receiving means in communication with said flow path at a point between said extruder and said controlling means for receiving plastic material which is conveyed through said flow path from said extruder when said controlling means is in its closed position, injecting means for injecting the plastic material received in said receiving means into said mold when said controlling means is in its open position, and maintaining means in communication with said flow path at a point between said mold and said controlling means for maintaining pressure on the plastic material which is contained in said mold when said controlling means is in its closed position, whereby said extruder can supply plastic material to said receiving means while said maintaining means continues to maintain the plastic material in the mold under pressure.

2. A method according to claim 1, wherein said screw of said extruder is mounted for reciprocating movement within said interior chamber of said extruder.

3. A method according to claim 1, wherein said screw of said extruder is not mounted for reciprocating movement within said interior chamber of said extruder.

4. A method according to claim 1, wherein said receiving means includes an interior chamber of a cylinder, said interior chamber of said cylinder communicating with said flow path at said point between said extruder and said controlling means, and wherein said injecting means includes a plunger which is mounted for reciprocating movement within said interior chamber of said cylinder.

5. A method according to claim 4, wherein said plunger is movable in said cylinder between an extended position and a retracted position.

6. A method according to claim 5, wherein said plunger is movable from its extended position to its retracted position by plastic material supplied to said interior chamber of said cylinder by said extruder.

7. A method according to claim 6, wherein said screw of said extruder is mounted for reciprocating movement in said interior chamber of said extruder between an extended position and a retracted position.

8. A method according to claim 7, wherein said screw is movable from its extended position to its retracted position by back pressure exerted on the plastic material in said interior chamber of said cylinder and transmitted to said screw.

9. A method according to claim 8, wherein said extruder includes inhibiting means for inhibiting the plastic material conveyed through said interior chamber of said extruder by said screw from reentering said screw.

10. A method according to claim 9, wherein said inhibiting means includes a check ring disposed about said screw adjacent to a discharge end thereof.

11. A method according to claim 7, wherein said screw and said plunger are simultaneously movable from their respective retracted positions to their respective extended positions when said controlling means is in its open position, whereby said screw and said plunger cooperate to inject the plastic material into said mold.

12. A method according to claim 4, wherein said maintaining means includes an interior chamber of another cylinder, said interior chamber of said another cylinder communicating with said flow path at said point between said mold and said controlling means, and another plunger which is mounted for reciprocating movement within said interior chamber of said another cylinder.

13. A method according to claim 1, wherein said receiving means, said injecting means and said maintaining means are removably attached to said extruder.

14. An injection molding method in which plastic material is supplied to a mold from an extruder through a flow part which extends between said mold and said extruder, said method comprising the steps of closing said flow path at a first point between said mold and said extruder, extruding plastic material from said extruder to receiving means which communicates with said flow path at a second point between said first point and said extruder, opening said flow path at said first point, injecting the plastic material from said receiving means into said mold through said flow path, closing said flow path at said first point, and maintaining the plastic material in said mold under pressure by exerting pressure on the plastic material at a third point along said flow path, said third point being located between said first point and said mold.

15. An injection molding method according to claim 14, wherein said extruder includes a rotatable screw which is mounted for reciprocating movement within an interior chamber of said extruder between an extended position and a retracted position.

16. An injection molding method according to claim 15, further comprising the step of moving said screw from its retracted position to its extended position simultaneously with the injection of plastic material into said mold from said receiving means, whereby said screw cooperates in the injection of the plastic material into the mold.

17. An injection molding method according to claim 16, wherein said screw is moved from its extended position to its retracted position by back pressure exerted on the plastic material in said receiving means and transmitted to said screw.

* * * * *

UNITED STATES PATENT AND TRADEMARK OFFICE
CERTIFICATE OF CORRECTION

PATENT NO. : 4,749,536
DATED : June 7, 1988
INVENTOR(S) : John J. Farrell

It is certified that error appears in the above-identified patent and that said Letters Patent is hereby corrected as shown below:

Column 1, line 23, change "to" to --in--.

Column 8, line 16, change "part" to --path--.

Signed and Sealed this

Twenty-eighth Day of June, 1994

Attest:

BRUCE LEHMAN

Attesting Officer     Commissioner of Patents and Trademarks